United States Patent [19]

Schievelbein

[11] 4,217,957
[45] Aug. 19, 1980

[54] OIL RECOVERY METHOD

[75] Inventor: Vernon H. Schievelbein, Houston, Tex.

[73] Assignee: Texaco Inc., White Plains, N.Y.

[21] Appl. No.: 950,199

[22] Filed: Oct. 10, 1978

[51] Int. Cl.² ............................................. E21B 43/22
[52] U.S. Cl. ................................... 166/273; 166/275; 252/8.55 D
[58] Field of Search ................ 252/8.55 D; 166/273, 166/274, 275; 252/558

[56] References Cited

U.S. PATENT DOCUMENTS

| 3,811,507 | 5/1974 | Flournoy et al. | 252/8.55 |
|---|---|---|---|
| 3,827,497 | 8/1974 | Dycus et al. | 252/8.55 |
| 3,977,471 | 8/1976 | Gale et al. | 252/8.55 X |
| 4,018,278 | 4/1977 | Shupe | 166/252 |
| 4,077,471 | 3/1978 | Shupe et al. | 252/8.55 X |

Primary Examiner—Herbert B. Guynn
Attorney, Agent, or Firm—Carl G. Ries; Robert A. Kulason; Gregory A. Cone

[57] ABSTRACT

Petroleum is extracted from a subterranean reservoir by injecting into injection wells an aqueous surfactant solution wherein the surfactant is a mixture of mono- and di-alkyl benzene polyethoxy alkyl sulfonates wherein the alkyl group contains the same number of carbon atoms in both components of the surfactant, driving the surfactant solution through the reservoir and recovering petroleum from production wells penetrating the reservoir. The fluid composition of the surfactant mixture is also claimed.

10 Claims, No Drawings

OIL RECOVERY METHOD

BACKGROUND OF THE INVENTION

1. Field of the Invention

This invention relates to enhanced oil recovery processes, utilizing a novel surfactant mixture comprising a mixture of mono- and di-alkyl benzene polyethoxy alkyl sulfonates wherein each alkyl group has the same number of carbon atoms in both components of the mixture.

This invention also relates to novel fluid compositions useful in oil recovery processes, herein comprising the aqueous solution of the above surfactant mixture.

2. Description of the Prior Art

The crude oil which has accumulated in subterranean reservoirs is recovered or produced through one or more wells drilled into the reservoir. Initial production of the crude oil is accomplished by "primary recovery" techniques wherein only the natural forces present in the reservoir are utilized to produce the oil. However, upon depletion of these natural forces and the termination of primary recovery a large portion of the crude oil remains trapped within the reservoir. Also, many reservoirs lack sufficient natural forces to be produced by primary methods from the very beginning. Recognition of these facts has lead to the development and use of many enhanced oil recovery techniques. Most of these techniques involve injection of at least one fluid into the reservoir to produce an additional amount of the crude oil therefrom. Some of the more common methods are water flooding, steam flooding, miscible flooding, $CO_2$ flooding, polymer flooding, surfactant flooding, caustic flooding, and in situ combustion.

Water flooding, which involves injection of water into the subterranean oil reservoir for the purpose of displacing the crude oil from the pore spaces of the reservoir rock toward the producing wells is the most economical and widely used of the enhanced oil recovery methods. Nevertheless, water does not displace oil with high efficiency because of the immiscibility between water and oil and because of the high interfacial tension between them.

Surfactant flooding involves the addition of one or more surface active agents, or surfactants, to the water flood for the purpose of minimizing the water flooding problems mentioned above. This has been an area of active interest in the art of enhanced oil recovery methods for many years. For example, in 1941, U.S. Pat. No. 2,233,381 disclosed the use of polyglycol ether as a surfactant which increases the capillary displacement efficiency of an aqueous flood. U.S. Pat. No. 3,302,713 discloses the use of petroleum sulfonates as effective surfactants in oil recovery operations. Other surfactants proposed for use in oil recovery processes include alkyl pyridinium salts, alkyl sulfonates, alkyl aryl sulfates, ethoxylated alkyl or alkyl aryl sulfates, alkyl sulfonates, alkyl aryl sulfonates, and quaternary ammonium salts.

While the above surfactants may be effective under ideal conditions, there are problems concerning the use of each in most petroleum reservoirs. Some of the most serious problems arise from the effects of the reservoir fluid salinity on the injected surfactant. The problems include the spontaneous formation of immobile emulsions and precipitation of the surfactant. Under such conditions, the art contains proposals to mix various chemically different types of surfactants, such as anionic and nonionic, to achieve a higher salinity tolerance for the mixture. However, even this is often not entirely satisfactory because as the mixture containing the dissimilar surfactants is driven through the formation, one of the surfactant components is commonly preferentially adsorbed to the mineral grains in the reservoir matrices, causing a change in the relative concentration of the surfactant components and resulting in a failure to maintain effective salinity tolerance.

The economic success of any oil recovery process will depend in large part on the efficiency and cost of the particular surfactant chemicals employed. It is therefore desirable to use a surfactant composition that can be synthesized at a relatively low cost and yet will recover oil with high efficiency.

SUMMARY OF THE INVENTION

The method of this invention is practiced in a petroleum reservoir which also contains brine by injecting into the reservoir an aqueous surfactant composition comprising a mixture of two chemicals, A and B, A being characterized by the formula

wherein m is a number from 1 to 6, X is a cation, R' is ethylene, propylene or hydroxy propylene, and $R_A$ is an alkyl benzene radical containing from 8 to 15 carbon atoms in the alkyl group and B being characterized by the formula

wherein m, R' and X have the same meaning as in A and $R_B$ is a dialkyl benzene radical containing within each alkyl group a number of carbon atoms that is from 2 less than to 2 more than, and preferably from 1 less than to 1 more than, that found in the single alkyl chain of A. This aqueous surfactant solution is then driven through the reservoir, and petroleum is then recovered from production wells.

Dodecylphenol polyethoxy ethyl sulfonate has been proposed in the literature as a useful oil recovery surfactant. Both U.S. Pat. No. 4,018,278 issued to R. Shupe and U.S. Pat. No. 3,977,471 issued to Gale et al, disclosed the use of this chemical in oil recovery processes.

DESCRIPTION OF THE PREFERRED EMBODIMENTS

The dodecylbenzene polyethoxy ethyl sulfonate used herein was prepared by the following process:

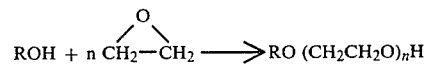

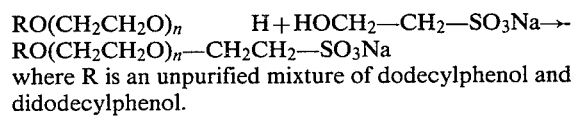

where R is an unpurified mixture of dodecylphenol and didodecylphenol.

The relative amount of the didodecylbenzene polyethoxy ethyl sulfonate in the final surfactant mixture is controlled by the amount of didodecylphenol that is present in the dodecylphenol in the first step of the above chemical synthesis.

Dodecylphenol in its impure form contains varying amounts of didodecylphenol. This didodecylcompound has heretofore been regarded as an undesirable impurity and has consequently been refined out leaving only the pure dodecylcompound. It has now been discovered that a certain range of mixtures of dodecyl and didodecylbenzene polyethoxy ethyl sulfonate can provide a substantially more effective surfactant than can either the dodecyl or the didodecylbenzene polyethoxy ethyl sulfonate alone. This surprising result is explained more fully in the example below.

EXAMPLE I

In this example mixtures of the following two chemicals were employed:

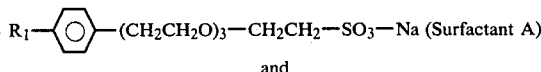

and

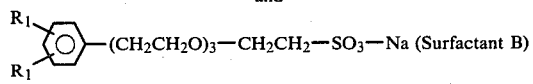

where $R_1$ is a dodecyl group.

These two chemicals in varying mole ratios were then diluted with an oil field brine which contained 85 kg/m³ total dissolved solids with 8 kg/m³ hardness to form the aqueous surfactant mixture utilized in the following experiments.

Interfacial tension tests were run using the above surfactant mixture at a concentration of 10 kg/m³. Crude oil from the same oil field was used for the hydrocarbon phase and measurements were made at 23° C. Results of these tests are reported in Table I.

These surfactant mixtures were also tested for enhanced oil recovery effectiveness. Berea sandstone cores, 5.08 cm in diameter and about 16 cm in length, were cleaned and dried. The cores were then saturated with oil field brine and crude oil thinned with 0.25 m³/m³ heptane to match reservoir viscosity. The cores were then water flooded with brine to irreducible water flood oil saturation. One pore volume of the various surfactant solutions at a concentration of from 9 to 10 kg/m³ was then driven through each of the cores by a polymer flood comprising about 2.0 pore volumes of a 1.0 kg/m³ solution of Xanflood polymer, a commercially available polysaccharide polymer, mixed with brine. The core floods were run at a rate of 1.5 meters per day at a temperature of 43° C. The polymer solution was followed by further injection of the brine until a final irreducible oil saturation was reached. This value was then compared with the irreducible oil saturation at the end of the initial water flood step and is reported in Table I as the recovery effeciency, $E_R$.

TABLE 1

| Mole Ratio B/A | Interfacial Tension, millidynes/cm | $E_R$, m³/m³ |
| --- | --- | --- |
| 0.00 | 68 | 0.34 |
| 0.05 | 31 | 0.45 |
| 0.11 | 18 | 0.62 |
| 0.18 | 8 | 0.71 |
| 0.25 | >1 | 0.56 |
| 0.33 | 3 | — |
| 0.45 | 326 | 0.49 |

These data clearly show that certain mixtures of the surfactant A and B are much more effective than a surfactant mixture containing surfactant A alone. One preferred mixture of surfactant A and B comprises a mole ratio of B to A of from about 0.05 to about 0.45. An especially preferred mixture of surfactant A and B comprises a mole ratio of B to A of from about 0.11 to about 0.25.

The above example is presented for purposes of illustration only and should not be deemed to limit the spirit of the invention. For reservoirs containing brines at different salinities and at different temperatures a different value for the number of moles of ethylene oxide contained in the surfactant may be necessary. In many cases it will be advantageous to add so-called "sacrificial agents". These are chemicals which are injected before or with a surfactant solution for the purpose of minimizing surfactant losses to reservoir matrix adsorption effects. Chemically modified lignosulfonates are often used for this purpose. It is anticipated that the most efficient combination of surfactant concentration, slug size, polymer concentration and type, as well as the use of other additives such as sacrificial agents will vary depending on the particular reservoir and conditions encountered. Generally, the surfactant slug will vary in volume from about 0.1 to about 5.0 pore volumes and in concentration of surfactant from about 1 to about 50 Kg/m³.

There are several advantages inherent in the method of this invention. One such advantage is the ability of this method to function effectively in reservoirs which contain fluids of up to about 220 kg/m³ salinity. The example above illustrates the use of this invention in a reservoir containing fluids of 85 kg/m³ salinity. However, the salinity tolerance may be increased by either varying the amount of the di-alkyl component, changing the moles of the ethylene oxide component of the surfactant, or adding trace amounts of a suitable hydrocarbon such as kerosene to the dilute surfactant mixture before injection into the reservoir in order to stabilize the surfactant solution. Modifications such as these to the method of this invention are well within the ability of one with ordinary skill in the art.

Another important advantage to this invention is the ease of synthesis of the surfactant itself. The prior art teaches only the use of the mono-alkyl form of the surfactant with no mention of the di-alkyl form or any advantage to the use thereof. In order to attain a relatively pure mono-alkyl form of the surfactant, an extra refining step is necessary in order to remove the di-alkyl component. This invention, however, clearly indicates that the di-alkyl component need not be removed from the initial mixture in that its retention is, in fact, highly desirable in respect to the oil recovery effectiveness of the final surfactant mixture.

I claim:

1. A process for recovering petroleum from an underground reservoir wherein the reservoir is penetrated by at least one injection well and at least one production well, said wells being in fluid communication with each other, and wherein the reservoir contains a brine with a salinity of up to about 220 kg/m³ comprising:
   a. injecting into the reservoir an effective amount of an aqueous surfactant-containing fluid which comprises a mixture of two chemicals, A and B, wherein A is characterized by the formula $$R_A(OCH_2CH_2)_m R'SO_3X$$

where m is a number from 1 to 6, X is a cation, R' is ethylene, propylene or hydroxy propylene, and $R_A$ is an alkyl benzene radical containing from 8 to 15 carbon atoms in the alkyl group, and wherein B is characterized by the formula $$R_B(OCH_2CH_2)_m R'SO_3X$$

where m, R' and X have the same meaning as in A and $R_B$ is a dialkyl benzene radical containing within each alkyl group a number of carbon atoms that is from 2 less than to 2 more than, that found in the single alkyl chain of A, wherein the mole ratio of B to A is from about 0.11 to about 0.25, b. forcing the surfactant containing fluid through the reservoir, and c. recovering petroleum from the reservoir.

2. The process of claim 1 wherein the surfactant-containing fluid further contains a stabilizing agent comprising a liquid hydrocarbon selected from the group consisting of crude oil and distilled fractions of crude oil in a concentration ranging from about 0.04 to about 10.0 percent by weight.

3. The process of claim 1 wherein the surfactant-containing fluid further contains a sacrificial agent.

4. The process of claim 1 wherein the means for forcing the surfactant-containing fluid through the reservoir comprises injecting a solution comprising water and an amount of a hydrophilic polymer sufficient to raise the viscosity of the solution to an effective level followed by a solution comprising water.

5. The process of claim 1 wherein the surfactant component of the surfactant-containing fluid in a total concentration ranging from about 1 to about 50 Kg/m$^3$.

6. A process for recovering petroleum from an underground reservoir wherein the reservoir is penetrated by at least one injection well and at least one production well, said wells being in fluid communication with each other, and wherein the reservoir contains a brine with a salinity of up to about 220 kg/m$^3$ comprising:

a. injecting into the reservoir an effective amount of an aqueous surfactant-containing fluid which comprises a mixture of two chemicals, A and B, wherein A is characterized by the formula
$$R_A(OCH_2CH_2)_mR'SO_3X$$

where m is a number from 1 to 6, R' is ethylene, propylene or hydroxy propylene, X is a cation and $R_A$ is a dodecyl benzene radical, and wherein B is characterized by the formula
$$R_B(OCH_2CH_2)_mR'SO_3X$$

where m, R', and X have the same meaning as in A and $R_B$ is a didodecyl benzene radical, wherein the mole ratio of B to A is from about 0.11 to about 0.25, b. forcing the surfactant-containing fluid through the reservoir, and c. recovering petroleum from the reservoir.

7. The process of claim 6 wherein the surfactant-containing fluid further contains a stabilizing agent comprising a liquid hydrocarbon selected from the group consisting of crude oil and distilled fractions of crude oil in a concentration ranging from about 0.01 to about 10.0 percent by weight.

8. The process of claim 6 wherein the surfactant-containing fluid further contains a sacrificial agent.

9. The process of claim 6 wherein the means for forcing the surfactant-containing fluid through the reservoir comprises injecting a solution comprising water and an amount of a hydrophilic polymer sufficient to raise the viscosity of the solution to an effective level followed by a solution comprising water.

10. The process of claim 6 wherein the surfactant component of the surfactant-containing fluid in a total concentration ranging from about 1 to about 50 Kg/m$^3$.

* * * * *